United States Patent
Cheng (10) Patent No.: US 11,368,777 B2
(45) Date of Patent: Jun. 21, 2022

(54) METHOD AND SYSTEM FOR UPGRADING PROGRAM OF TWS HEADSET, AND TWS HEADSET

(71) Applicant: GOERTEK TECHNOLOGY CO., LTD., Qingdao (CN)

(72) Inventor: Lin Cheng, Qingdao (CN)

(73) Assignee: GOERTEK TECHNOLOGY CO., LTD., Shandong (CN)

( * ) Notice: Subject to any disclaimer, the term of this patent is extended or adjusted under 35 U.S.C. 154(b) by 105 days.

(21) Appl. No.: 17/055,013

(22) PCT Filed: Jul. 26, 2018

(86) PCT No.: PCT/CN2018/097206
§ 371 (c)(1),
(2) Date: Nov. 12, 2020

(87) PCT Pub. No.: WO2019/237458
PCT Pub. Date: Dec. 19, 2019

(65) Prior Publication Data
US 2021/0235183 A1   Jul. 29, 2021

(30) Foreign Application Priority Data

Jun. 15, 2018 (CN) .......................... 201810622513.4

(51) Int. Cl.
*H04R 1/10* (2006.01)
*H04R 5/033* (2006.01)
(Continued)

(52) U.S. Cl.
CPC ........... *H04R 1/1041* (2013.01); *G06F 8/658* (2018.02); *H04L 67/34* (2013.01); *H04R 1/1025* (2013.01);
(Continued)

(58) Field of Classification Search
CPC .... H04R 1/1041; H04R 1/1025; H04R 5/033; H04R 5/04; H04R 2420/07; H04W 76/14; H04W 4/80; G06F 8/658; H04L 67/34
See application file for complete search history.

(56) References Cited

U.S. PATENT DOCUMENTS 9,128,796 B2 * 9/2015 Chitre ...................... G06F 8/65
2004/0261072 A1  12/2004 Herle
(Continued)

FOREIGN PATENT DOCUMENTS

| CN | 106685688 A | 5/2017 |
| CN | 107844307 A | 3/2018 |
| CN | 107894881 A | 4/2018 |

OTHER PUBLICATIONS

International Search Report, PCT/CN2018/097206 filed Jul. 26, 2018, dated Mar. 1, 2019.

*Primary Examiner* — David L Ton
(74) *Attorney, Agent, or Firm* — Workman Nydegger (57) ABSTRACT

Provided are a program upgrade method, a TWS headphone, a method and system for upgrading a program of a TWS headphone. The program upgrade method, applied to a TWS headphone including a first wireless headphone and a second wireless headphone arranged in pairs, includes, establishing a wireless communication connection between the first wireless headphone and terminal, and receiving, by the first wireless headphone, a first upgrade file sent by the terminal for upgrade; and establishing a wireless communication connection between the second wireless headphone and the terminal, and receiving, by the second wireless headphone, a second upgrade file sent by the terminal for upgrade after the first wireless headphone completes upgrade.

15 Claims, 5 Drawing Sheets

---

Establish a wireless communication connection between the first wireless headphone and a terminal, and receive, by the first wireless headphone, a first upgrade file sent by the terminal for upgrade — S101

Establish a wireless communication connection between the second wireless headphone and the terminal, and receive, the second wireless headphone, a second upgrade file sent by the terminal for upgrade after the first wireless headphone completes upgrade — S102

(51) Int. Cl.
*H04R 5/04* (2006.01)
*G06F 8/658* (2018.01)
*H04W 76/14* (2018.01)
*H04W 4/80* (2018.01)
*H04L 67/00* (2022.01)

(52) U.S. Cl.
CPC ............... *H04R 5/033* (2013.01); *H04R 5/04* (2013.01); *H04W 4/80* (2018.02); *H04W 76/14* (2018.02); *H04R 2420/07* (2013.01)

(56) References Cited

U.S. PATENT DOCUMENTS

2014/0068592 A1 3/2014 Chitre et al.
2019/0174232 A1 6/2019 Zhang et al.

* cited by examiner

METHOD AND SYSTEM FOR UPGRADING PROGRAM OF TWS HEADSET, AND TWS HEADSET

The present disclosure is the national phase of International Application No. PCT/CN2018/097206, titled "METHOD AND SYSTEM FOR UPGRADING PROGRAM OF TWS HEADSET, AND TWS HEATSET", filed on Jul. 26, 2018, which claims priority to Chinese Patent Application No. 201810622513.4, titled "METHOD AND SYSTEM FOR UPGRADING PROGRAM OF TWS HEADSET, AND TWS HEADSET", filed on Jun. 15, 2018 with the China National Intellectual Property Administration (CNIPA), which is incorporated herein by reference in its entirety.

FIELD

The present disclosure relates to the technical field of portable listening device, and in particular, to a method and a system for upgrading a program of a true wireless stereo (TWS) headphone, and a TWS headphone.

BACKGROUND

A headphone is a pair of conversion units used for receiving an electrical signal sent by a media player or a receiver, and converting the electrical signal into an audible sound wave by speakers close to ears.

At present, the headphone may be classified to a wired headphone and a wireless headphone. For the wired headphone, it is required two headphones including a left headphone and a right headphone which form a left sound channel and a right sound channel through a wire connection, thus to produce a stereophonic effect. However, the wired headphone is relatively inconvenient to wear. The wireless headphone is communicated with a terminal through a wireless communication connection protocol (such as Bluetooth). Compared with the wired headphone, the wireless headphone has the characteristics of no need to pack a data cable and convenient use. A latest true wireless interconnected stereo (TWS) Bluetooth headphone is a typical kind of wireless headphones.

At present, the TWS headphone includes a master headphone and a slave headphone. An Over-the-Air (OTA) technology is usually applied to upgrade a program of the TWS. An upgrade process of the TWS is: firstly upgrading the master headphone, and then upgrading the slave headphone through the master headphone. However, such upgrade process is easy to fail due to an instable connection between the master headphone and the slave headphone. Moreover, since the master headphone is required as a relay station, it not only prolongs the time required for upgrade, and but also occupies hardware resources of the master headphone.

SUMMARY

The present disclosure aims to provide a feasible method and system for upgrading a program of a TWS headphone, and a TWS headphone, so as to solve the problems of instability, a long upgrade time and hardware resource occupation in the existing program upgrade process.

To solve the above technical problems, a program upgrade method is provided in the present disclosure. The program upgrade method is applied to a TWS headphone, where the TWS headphone includes a first wireless headphone and a second wireless headphone arranged in pairs. The program upgrade method includes:

establishing a wireless communication connection between the first wireless headphone and a terminal, and receiving, by the first wireless headphone, a first upgrade file sent by the terminal for upgrade; and establishing a wireless communication connection between the second wireless headphone and the terminal, and receiving, by the second wireless headphone, a second upgrade file sent by the terminal for upgrade after the first wireless headphone completes upgrade.

In an embodiment, the establishing a wireless communication connection between the first wireless headphone and a terminal includes:

receiving, by the first wireless headphone, an upgrade instruction, generating an upgrade response information for entering an over-the-air (OTA) mode, and sending the upgrade response information to the terminal, for the terminal to receive the upgrade response information and establish a Bluetooth low energy (BLE) wireless communication connection with the first wireless headphone.

In an embodiment, the receiving, by the first wireless headphone, an upgrade instruction and generating an upgrade response information for entering an OTA mode includes:

performing a BLE broadcast by a headphone charging box in a case that the headphone charging box detects a preset event, where a broadcast field includes a field for notifying the headphone to prepare to enter the OTA mode; and executing, by the first wireless headphone, an OTA code segment and performing a wireless communication scanning in a case that the headphone charging box detects that the first wireless headphone is placed at a first preset position, and generating, by the first wireless headphone, the upgrade response information for entering the OTA mode when an OTA signal is scanned by the first wireless headphone within a preset time period.

In an embodiment, the program upgrade method further includes:

disconnecting, by the first wireless headphone, the BLE wireless communication connection with the terminal, after the first wireless headphone completes upgrade; and sending an upgrade completion instruction to the terminal, for the terminal to prompt an information display item indicating that an upgrade operation is completed and prompt an operation display information about disconnecting the BLE broadcast of the headphone charging box, after the second wireless headphone completes upgrade.

A TWS headphone is further provided in the present disclosure. The TWS headphone includes: an audio output, a communication interface, a memory and a processor, where the processor is configured to upgrade a program of the TWS headphone by applying any one of the program upgrade methods described above.

A method for upgrading a program of a TWS headphone is further provided in the present disclosure, where the TWS headphone includes a first wireless headphone and a second wireless headphone arranged in pairs, and the method includes:

establishing a wireless communication connection between a terminal and the first wireless headphone, and sending a first upgrade file for upgrade to the first wireless headphone through the terminal; and establishing a wireless communication connection between the terminal and the second wireless headphone, and sending a second upgrade file for upgrade to the second wireless headphone through the terminal after the first wireless headphone completes upgrade.

In an embodiment, before the establishing a wireless communication connection between a terminal and the first wireless headphone, and sending a first upgrade file for upgrade to the first wireless headphone through the terminal, the method further includes:

outputting an option for prompting whether to upgrade, when the terminal detects that a program version in a cloud has been updated; and receiving an option instruction for performing a program upgrade, and prompting an operation instruction information for starting the program upgrade.

A system for upgrading a program of a TWS headphone is further provided in an embodiment. The system includes: a terminal and a TWS headphone, where the terminal is configured to:

establish a wireless communication connection with a first wireless headphone, and send a first upgrade file for upgrade to the first wireless headphone; and establish a wireless communication connection with a second wireless headphone, and send a second upgrade file for upgrade to the second wireless headphone after the first wireless headphone completes upgrade.

In an embodiment, the first wireless headphone is configured to: receive an upgrade instruction, generate an upgrade response information for entering an OTA mode, and send the upgrade response information to the terminal; and the terminal is configured to: receive the upgrade response information, and establish a Bluetooth low energy (BLE) wireless communication connection with the first wireless headphone.

In an embodiment, the system further includes a headphone charging box, configured to perform a BLE broadcast in response to detecting a preset event, where a broadcast field includes a field for notifying the headphone to prepare to enter the OTA mode; and the first wireless headphone is configured to: execute an OTA code segment and perform a wireless communication scanning, in response to detecting that the first wireless headphone is placed at a first preset position of the headphone charging box; and generate the upgrade response information for entering the OTA mode when an OTA signal is scanned within a preset time period.

A computer-readable storage medium for storing a computer program, where the computer program, when executed by a processor, implements the program upgrade method described above; or, the computer program, when executed by the processor, implements the method for upgrading a program of a TWS headphone described above.

In the program upgrade method according to an embodiment of the present disclosure, the TWS headphone includes the first wireless headphone and the second wireless headphone arranged in pairs; upon upgrading, the wireless communication connection between the first wireless headphone and the terminal is established, and the first wireless headphone receives the first upgrade file sent by the terminal for upgrade; the wireless communication connection between the second wireless headphone and the terminal is established, and after the first wireless headphone completes upgrade, the second wireless headphone receives the second upgrade file sent by the terminal for upgrade. Therefore, the two headphones are upgraded separately through the terminal, and there is no need of a communication connection between a master headphone and a slave headphone for transmitting upgrade data, thereby avoiding upgrade failures due to unstable connections between the two headphones and improving the reliability of an upgrade operation. Furthermore, in the present disclosure, there is no need for the master headphone to implement a series of processes such as storing upgrade data firstly, reading upgrade data, and forwarding upgrade data to the slave headphone, that is, the master headphone does not need to transfer data. Thus, the upgrade time is saved, and on the other hand, consumption of resources of the master headphone occupied by transferring data are avoided since the master headphone is not required to perform operations such as storing and reading data. In addition, the method for upgrading a program of a TWS headphone, the TWS headphone, and the system for upgrading a program of a TWS headphone with the aforementioned advantages are also provided in embodiments of the present disclosure.

BRIEF DESCRIPTION OF THE DRAWINGS

In order to more clearly illustrate technical solutions in embodiments of the present disclosure or in the conventional technology, drawings used in the description of the embodiments or the conventional technology are introduced briefly hereinafter. Apparently, the drawings described in the following illustrate some embodiments of the present disclosure, and other drawings may be obtained by those ordinary skilled in the art based on these drawings without any creative efforts.

DETAILED DESCRIPTION

To make the skilled in the art better understand the technical solutions of the present application, the present disclosure will be described clearly and completely hereinafter in conjunction with the drawings and the embodiments. Apparently, the described embodiments are only a part of the embodiments of the present disclosure, rather than all embodiments. Based on the embodiments in the present disclosure, all other embodiments, obtained by the skilled in the art without any creative efforts, fall within the scope of protection of the present disclosure.

A program upgrade method is provided in the present disclosure. The program upgrade method is applied to a TWS headphone. In the present disclosure, the TWS headphone is paired with a terminal device (such as a computer, a smart phone, a tablet, a smart watch, etc.) through a wireless communication protocol (such as Bluetooth) for data transmission. The TWS headphone further includes a headphone charging box used in conjunction with the headphone. The headphone charging box is provided with a cavity inside for containing the headphone, and the headphone charging box is configured to charge the wireless headphone when the headphone is placed in the cavity.

The TWS headphone includes a first wireless headphone and a second wireless headphone arranged in pairs. The first wireless headphone and the second wireless headphone together may form a pair of TWS headphones. The first wireless headphone and the second wireless headphone are configured to output audio to a left ear and a right ear respectively. The "first" in the first wireless headphone and the "second" in the second wireless headphone are not specifically limited, and are only used for distinction.

Figure 1:
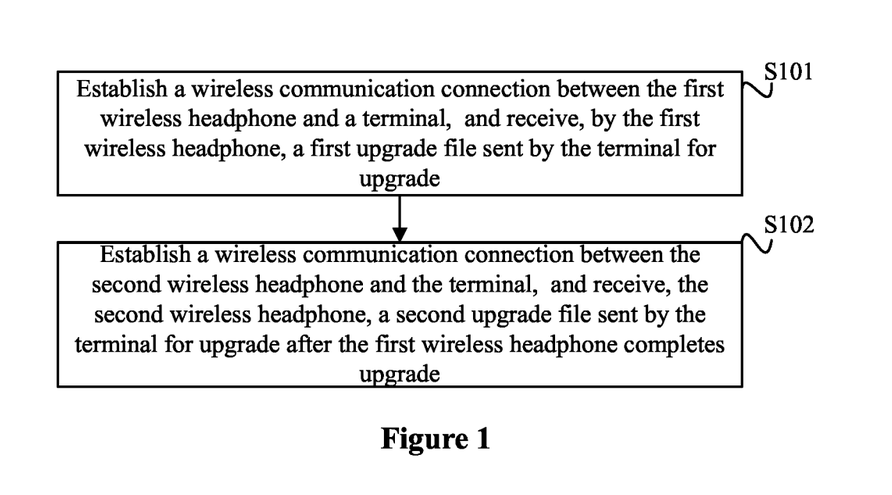
FIG. 1 is a flow chart of a program upgrade method according to an embodiment of the present disclosure.

Reference is made to FIG. 1, which is a flow chart of a method for upgrading a program of a TWS headphone according to the present disclosure. The method includes following steps S101 and S102.

In step S101, a wireless communication connection between the first wireless headphone and a terminal is established, and a first upgrade file sent by the terminal for upgrade is received by the first wireless headphone.

In step S102, a wireless communication connection between the second wireless headphone and the terminal is established, and a second upgrade file sent by the terminal for upgrade is received by the second wireless headphone after the first wireless headphone completes upgrade.

The process of establishing the wireless communication connection between the second wireless headphone and the terminal may be performed before, at the same time or after the terminal sends the first upgrade file to the first wireless headphone. The execution order of the process of establishing the wireless communication connection between the second wireless headphone and the terminal will not affect the implementation of the present disclosure, and thus it is not limited herein. As a specific implementation, in this embodiment, after the first wireless headphone completes upgrade, the wireless communication connection between the first wireless headphone and the terminal may be disconnected, and then the wireless communication connection between the second wireless headphone and the terminal may be established, to upgrade the second wireless headphone.

It should be noted that, in the present disclosure, the first upgrade file received by the first wireless headphone and the second upgrade file received by the second wireless headphone may be a same upgrade file, or, they may also be different upgrade files, which are not limited herein.

In the program upgrade method according to the present disclosure, the TWS headphone includes the first wireless headphone and the second wireless headphone arranged in pairs; upon upgrading, the wireless communication connection between the first wireless headphone and the terminal is established, and the first wireless headphone receives the first upgrade file sent by the terminal for upgrade; the wireless communication connection between the second wireless headphone and the terminal is established, and after the first wireless headphone completes upgrade, the second wireless headphone receives the second upgrade file sent by the terminal for upgrade. Therefore, the two headphones are upgraded separately through the terminal, and there is no need of a communication connection between a master headphone and a slave headphone for transmitting upgrade data, thereby avoiding upgrade failures due to unstable connections between the two headphones and improving the reliability of an upgrade operation. Furthermore, in the present disclosure, there is no need for the master headphone to implement a series of processes such as storing upgrade data firstly, reading upgrade data, and forwarding upgrade data to the slave headphone, that is, the master headphone does not need to transfer data. Thus, the upgrade time is saved, and on the other hand, consumption of resources of the master headphone occupied by transferring data are avoided since the master headphone is not required to perform operations such as storing and reading data.

Figure 2:
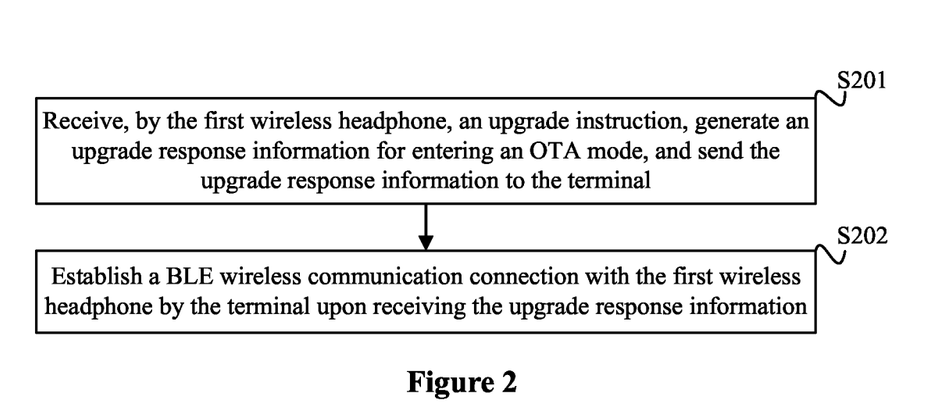
FIG. 2 is a flow chart of establishing a wireless communication connection according to an embodiment of the present disclosure.

The wireless communication connection between the terminal and the wireless headphones may be established by means of Bluetooth, or by means of other wireless methods. Taking the first wireless headphone as an example, a detailed implementation of establishing a wireless communication connection in the present disclosure will be illustrated hereinafter. Reference is made to FIG. 2, which is a flow chart illustrating a process of establishing a wireless communication connection according to the present disclosure. The process includes following steps S201 and S202.

In step S201, an upgrade instruction is received by the first wireless headphone, an upgrade response information for entering an OTA mode is generated, and the upgrade response information is sent to the terminal.

Figure 3:
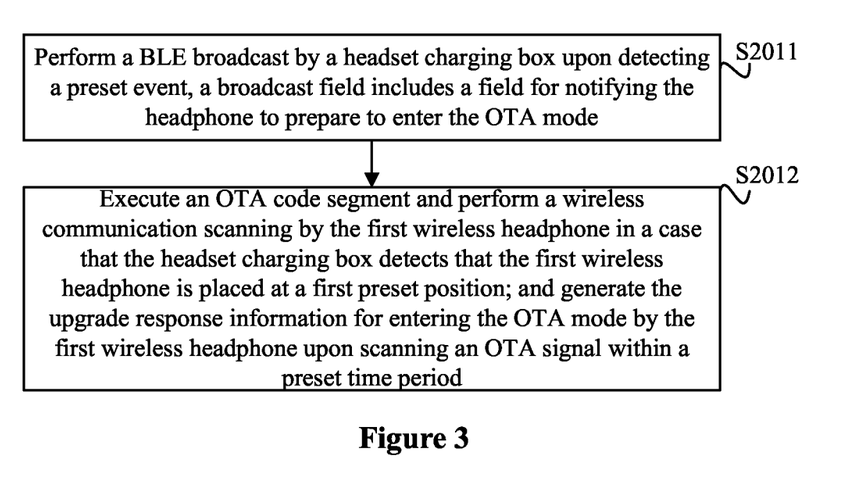
FIG. 3 is a flow chart illustrating a process of sending an OTA instruction through a headphone charging box according to an embodiment of the present disclosure.

Specifically, the upgrade instruction received by the first wireless headphone may be sent by the terminal directly, or may be sent by a headphone charging box of the TWS headphone. FIG. 3 illustrates a detailed process in a case that the upgrade instruction is sent by the headphone charging box of the TWS headphone, which includes the following steps S2011 and S2012.

In step S2011, in a case of detecting a preset event by the headphone charging box, the headphone charging box performs a BLE broadcast, where a broadcast field includes a field for notifying the headphone to prepare to enter the OTA mode.

The preset event may be a long-press operation on a preset button of the headphone charging box. The wireless communication method in this embodiment may be the BLE broadcast (Bluetooth Low Energy Technology) method, or other methods such as a traditional Bluetooth method, which are not limited herein.

In step S2012, in a case of detecting, by the headphone charging box, that the first wireless headphone is placed at a first preset position, the first wireless headphone executes an OTA code segment and performs a wireless communication scanning; and generates the upgrade response information for entering the OTA mode when an OTA signal is scanned by the first wireless headphone within a preset time period.

Figure 4:
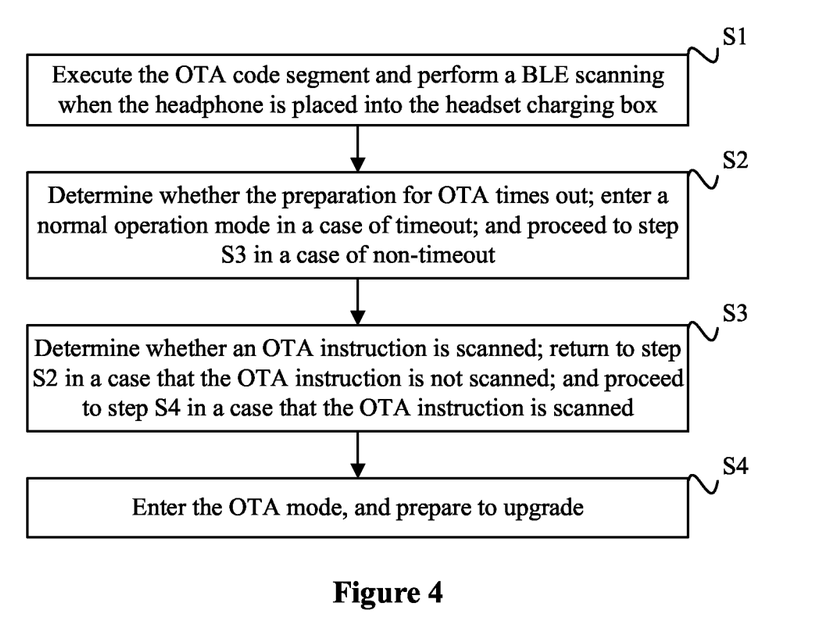
FIG. 4 is a flow chart illustrating a process of putting a headphone into a headphone charging box according to an embodiment of the present disclosure.

Reference is made to FIG. 4, which is a flow chart illustrating a process of putting a headphone into a headphone charging box. The process may include the following steps S1 to S4.

In step S1, an OTA code segment is executed and a BLE scanning is performed, when the headphone is placed in the headphone charging box.

In step S2, it is determined whether preparation for OTA times out. If it is determined that the preparation for OTA times out, a normal operation mode is entered; and if it is determined that the preparation for OTA does not time out, proceed to step S3.

In step S3, it is determined whether an OTA instruction is scanned. If it is determined that the OTA instruction is not scanned, return to the step S2; and if it is determined that the OTA instruction is scanned, proceed to step S4.

In step S4, the OTA mode is entered, and an upgrade process is prepared.

The process of notifying the headphone whether to enter the OTA mode by the headphone charging box may be implemented by extending an OTA scanning of a conventional headphone charging box, without additional development settings on a mobile phone side, which is convenient for development. Moreover, the headphone is placed in the headphone charging box during an entire upgrade process, thus avoiding upgrade failures due to insufficient power and ensuring the stability of charging.

In step S202, the upgrade response information is received by the terminal, and a BLE wireless communication connection with the first wireless headphone is established.

Further, the method according to an embodiment of the present disclosure may further include a step of disconnecting, by the first wireless headphone, the BLE wireless communication connection with the terminal after the first wireless headphone completes upgrade. Similarly, the BLE wireless communication connection between the second wireless headphone and the terminal is disconnected after the second wireless headphone completes upgrade. In this way, it may avoid power consumption of the two headphones due to continuous communication, and on other aspect, it may prevent other settings from stealing important information through the connection, thereby ensuring the security of communication. After the second wireless headphone completes upgrade, the method further includes: sending an upgrade completion instruction to the terminal, for the terminal to prompt an information display item indicating that an upgrade operation is completed and prompt an operation display information about disconnecting the BLE broadcast of the headphone charging box. Thus, it may avoid the headphone charging box being in a continuous power consumption state, thus to save energy.

Figure 5:
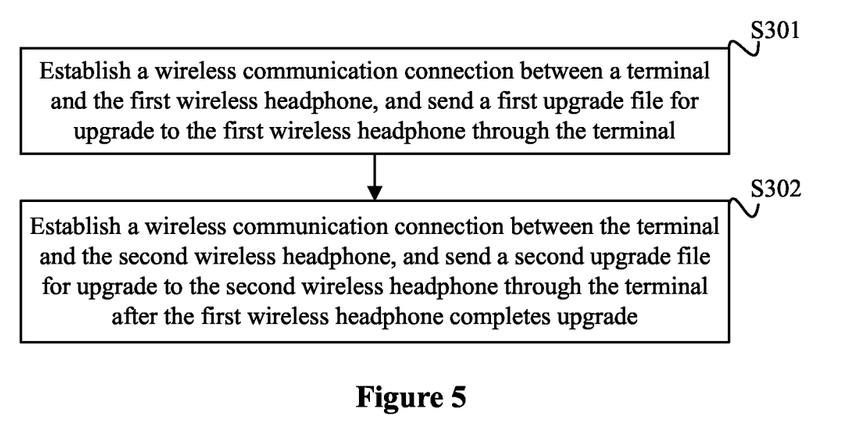
FIG. 5 is a flow chart of a method for upgrading a program of a TWS headphone according to another embodiment of the present disclosure.

In addition, a method for upgrading a program of a TWS headphone is further provided in the present disclosure, where the TWS headphone includes a first wireless headphone and a second wireless headphone arranged in pairs. The method is applied to a terminal, and may be implemented by combining software and hardware of a terminal. As shown in FIG. 5, the method includes the following steps S301 and S302.

In step S301, a wireless communication connection between a terminal and the first wireless headphone is established, and a first upgrade file for upgrade is sent to the first wireless headphone through the terminal.

In step S302, a wireless communication connection between the terminal and the second wireless headphone is established, and a second upgrade file for upgrade is sent to the second wireless headphone through the terminal after the first wireless headphone completes upgrade.

It should be noted that, the method for upgrading a program of a TWS headphone provided in the present disclosure corresponds to the program upgrading method applied to the TWS headphone described above. Specific implementations thereof may refer to the aforementioned process, which will not be repeated herein.

On a basis of any one of embodiments described above, before the step of establishing the wireless communication connection between the terminal and the first wireless headphone and sending the first upgrade file for upgrade to the first wireless headphone through the terminal, the method further includes:

outputting an option for prompting whether to upgrade, in response to detecting, by the terminal, that a program version in a cloud has been updated; and receiving an option instruction for performing a program upgrade, and prompting an operation instruction information for starting the program upgrade.

In this embodiment, when the terminal detects that the program version in the cloud has been updated, an option about whether to upgrade may be prompted to a user on a human-computer interaction interface. If the user confirms to perform an upgrade, an option instruction for performing a program upgrade is inputted to the human-computer interaction interface. After receiving the option instruction, the human-computer interaction interface displays an operation instruction information on some operations to be performed during the program upgrade process, for example, displays an information of "please put the left headphone in the corresponding position" or the like to instruct the user how to operate. Through the human-computer interaction process in this embodiment, the upgrade process is performed more humane, and the user experience is improved.

Figure 6:
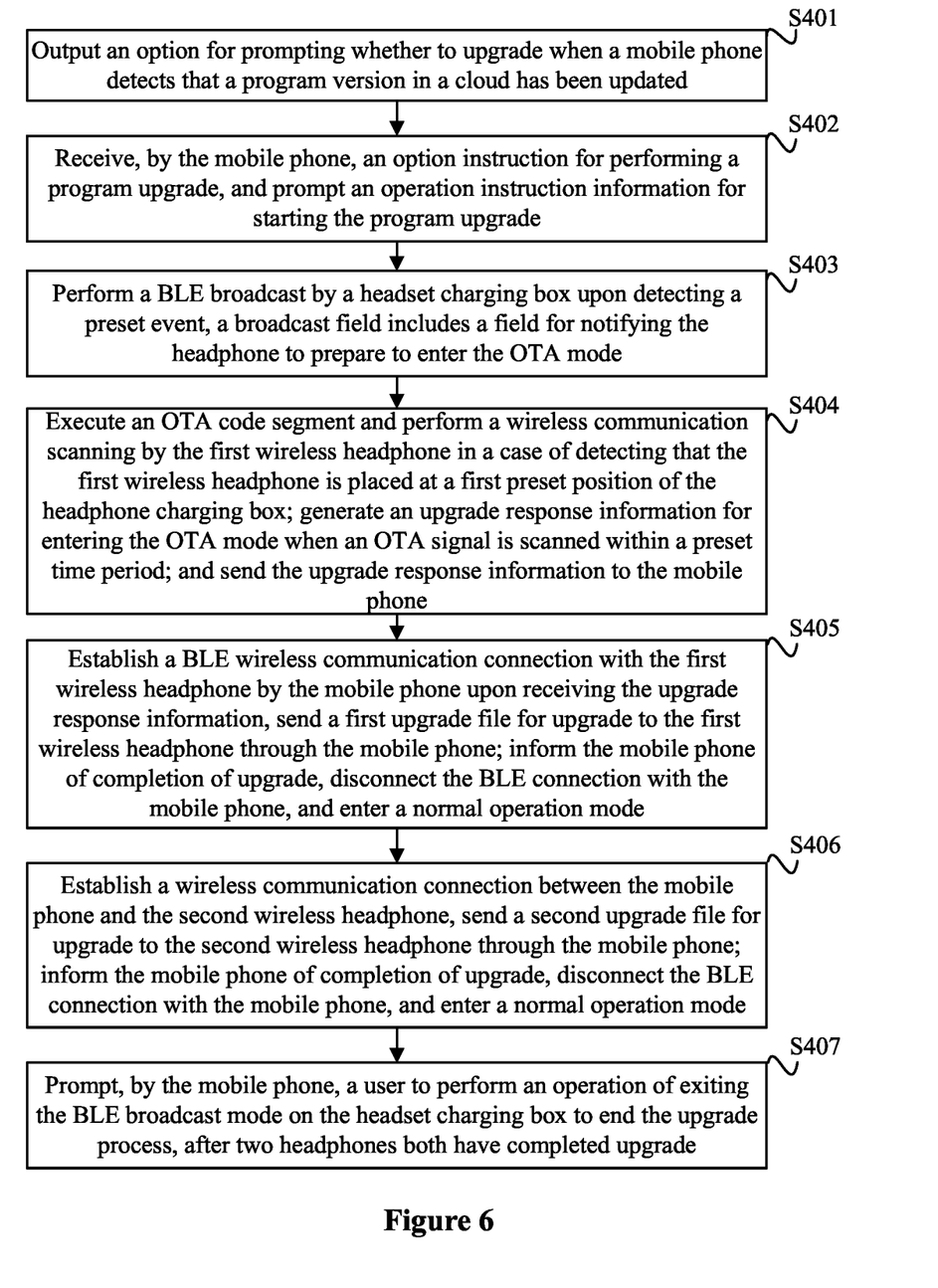
FIG. 6 is a flow chart of a method for upgrading a program of a TWS headphone according to still another embodiment of the present disclosure.

Referring to FIG. 6, taking the terminal specifically as a mobile phone as an example, a method for upgrading a program of a TWS headphone according to the present disclosure is illustrated hereinafter. The method includes the following steps S401 to S407.

In step S401, an option for prompting whether to upgrade is outputted when a mobile phone detects that a program version in a cloud has been updated.

When the mobile phone detects a new program version update in the cloud, the mobile phone prompts a user whether to upgrade, for the user to select whether to upgrade. If the user confirms to upgrade, the subsequent upgrade process is performed.

In step S402, an option instruction for performing a program upgrade is received by the mobile phone, to prompt an operation instruction information for starting the program upgrade.

When the user selects the option instruction of "upgrade", that is, when the user confirms to perform an upgrade operation, prompt information indicating which operations the user needs to perform may be displayed on the mobile phone. For example, the prompt information may be "trigger a preset event on the headphone charging box, and put the headphone to be upgraded in a preset position".

In step S403, the headphone charging box performs a BLE broadcast in response to detecting a preset event, where a broadcast field includes a field for notifying the headphone to prepare to enter the OTA mode.

The preset event may be an event of detecting that the headphone is taken out of the headphone charging box and the time duration that a preset button on the headphone charging box being triggered exceeding a preset threshold (e.g., 10 s). If the preset event is detected, the BLE broadcast is performed. The broadcast information includes a field for notifying the headphone to enter the OTA mode. At this time, the mobile phone prompts the user to put the first wireless headphone into the headphone charging box, and the user follows the prompt to put the first wireless headphone into the headphone charging box.

In step S404, the first wireless headphone executes an OTA code segment and performs a wireless communication scanning in a case of detecting that the first wireless headphone is placed at a first preset position of the headphone charging box; the first wireless headphone generates an upgrade response information for entering the OTA mode when an OTA signal is scanned within a preset time period;

and the first wireless headphone sends the upgrade response information to the mobile phone.

The first wireless headphone may execute the OTA code segment after being placed in the headphone charging box. The first wireless headphone may exit the OTA preparation mode if timeout, and enter a normal operation mode. A BLE scanning will be performed at regular intervals until timeout. If an OTA instruction is scanned, an upgrade operation is performed on the first wireless headphone, that is, when the OTA instruction is received, a message indicating that an upgrade operation is ready will be broadcasted through BLE.

In step S405, the mobile phone establishes a BLE wireless communication connection with the first wireless headphone upon receiving the upgrade response information, sends a first upgrade file for upgrade to the first wireless headphone, informs the mobile phone of completion of upgrade, disconnects the BLE connection with the mobile phone, and enters a normal operation mode.

After receiving the upgrade response information, the mobile phone establishes the BLE connection with the headphone and sends the upgrade file to the headphone. The headphone receives the upgrade file and performs an upgrade operation. After completion of upgrade, the headphone informs the mobile phone and disconnects the BLE connection with the mobile phone.

In step S406, a wireless communication connection between the mobile phone and the second wireless headphone is established, a second upgrade file for upgrade is sent to the second wireless headphone through the mobile phone. After completion of upgrade, the second wireless headphone informs the mobile phone, disconnects the BLE connection with the mobile, and enters a normal operation mode.

An upgrade process of the second wireless headphone is the same as the upgrade process of the first wireless headphone.

In step S407, after the two headphones both complete upgrade, the mobile phone prompts the user to perform an operation of exiting the BLE broadcast mode on the headphone charging box, to end the upgrade process.

The program upgrade process of a TWS headphone described above may be divided into three stages: a preparation stage, a first wireless headphone upgrade stage, and a second wireless headphone upgrade stage.

In the preparation stage, the mobile phone prompts the user whether to upgrade in response to detecting a new software version in the cloud. If the user selects an option instruction of "upgrade", takes all headphones out of the headphone charging box according to the prompt of the mobile phone, and presses a button of the headphone charging box for 10 s to make the headphone charging box perform the BLE broadcast. The broadcast information includes the field for notifying the headphone to enter the OTA mode. At this time, the mobile phone prompts the user to put the first wireless headphone into the headphone charging box, and the user follows the prompt to put the first wireless headphone into the headphone charging box.

In the first wireless headphone upgrade stage, the first wireless headphone may execute the OTA code segment after being placed into the headphone charging box. The first wireless phone may exit the OTA preparation mode if timeout, and enters a normal operation mode. A BLE scanning will be performed at regular intervals until timeout. If an OTA instruction is scanned, an upgrade operation is performed on the first wireless headphone, that is, when the OTA instruction is received, a message indicating that an upgrade operation is ready will be broadcasted through BLE. After receiving the message, the mobile phone establishes the BLE connection with the headphone and sends the upgrade file to the headphone. The headphone receives the upgrade file and performs an upgrade operation. After completion of upgrade, the headphone informs the mobile phone and disconnects the BLE connection with the mobile phone.

In the second wireless headphone upgrade stage, the upgrade process of the second wireless headphone is the same as the upgrade process of the first wireless headphone.

After the two headphones both complete upgrade, the mobile phone prompts a message of "upgrade completion" to the user, and prompts the user to press the button of the headphone charging box for 10 s, to make the headphone charging box exit the BLE broadcast. At this time, the OTA mode is finished.

According to the method for upgrading a program of a TWS headphone provided by the present disclosure, the two headphones are successively notified to enter the OTA mode through the headphone charging box, and the two headphones are successively upgraded through the mobile phone. The first wireless headphone may be a left headphone, and the second wireless headphone may be a right headphone. Of course, the upgrade sequences of the two headphones may be interchanged, which will not affect the implementation of the present disclosure. Since the two headphones are upgraded respectively through the mobile phone, the time required for the upgrade process is saved, and the reliability of the upgrade operation is improved.

Figure 7:
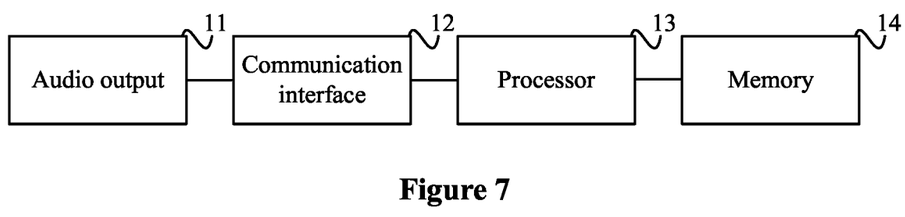
FIG. 7 is a structural block diagram of a TWS headphone according to an embodiment of the present disclosure.

Reference is made to FIG. 7, which is a structural block diagram of a TWS headphone according to an embodiment of the present disclosure. A TWS headphone 1 is further provided in the present disclosure, and the TWS headphone 1 includes an audio output 11, a communication interface 12, a processor 13 and a memory 14. The processor 13 is configured to perform a program upgrade by applying any one of the methods for upgrading the program of the TWS headphone described above. The two wireless headphones in the present disclosure are upgraded respectively through the terminal, without upgrade data transmission through a communication connection between a master headphone and a slave headphone, thereby avoiding upgrade failures due to unstable connections between the two headphones and improving the reliability of an upgrade process. Furthermore, there is no need for the master headphone to implement a series of processes such as storing upgrade data firstly, reading upgrade data, and forwarding upgrade data to the slave headphone, that is, the master headphone does not need to transfer data. Thus, the upgrade time is saved, and on the other hand, consumption of resources of the master headphone occupied by transferring data is avoided since the master headphone is not required to perform processes such as storing and reading data.

Figure 8:
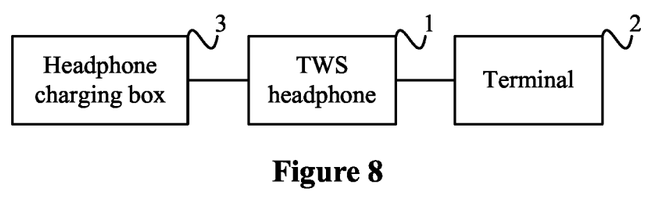
FIG. 8 is a structural block diagram of a system for upgrading a program of a TWS headphone according to an embodiment of the present disclosure.

In addition, a system for upgrading a program of a TWS headphone is provided in the present disclosure. The system includes: a terminal 2 and a TWS headphone 1. Reference is made to FIG. 8, which is a structural block diagram of a system for upgrading a program of a TWS headphone in the present disclosure. The terminal 2 is configured to: establish a wireless communication connection with a first wireless headphone, and send a first upgrade file for upgrade to the first wireless headphone; and establish a wireless communication connection with a second wireless headphone, and send a second upgrade file for upgrade to the second wireless headphone.

Specifically, the first wireless headphone is configured to: receive an upgrade instruction, generate an upgrade response information for entering an OTA mode, and send the upgrade response information to the terminal.

The terminal is configured to: receive the upgrade response information, and establish a BLE wireless communication connection with the first wireless headphone.

Further, the system for upgrading the program of the TWS headphone according to the present disclosure may further include: a headphone charging box 3, configured to perform a BLE broadcast in response to detecting a preset event, where a broadcast field includes a field for notifying the headphone to prepare to enter the OTA mode.

In a case of detecting that the first wireless headphone is placed at a first preset position of the headphone charging box, the first wireless headphone is configured to: execute an OTA code segment and perform a wireless communication scanning; and generate the upgrade response information for entering the OTA mode when an OTA signal is scanned within a preset time period.

The two headphones in the present disclosure are upgraded respectively through the terminal, without upgrade data transmission through a communication connection between a master headphone and a slave headphone, thereby avoiding upgrade failures due to unstable connections between the two headphones and improving the reliability of an upgrade process. Furthermore, there is no need for the master headphone to implement a series of processes such as storing upgrade data firstly, reading upgrade data, and forwarding upgrade data to the slave headphone, that is, the master headphone does not need to transfer data. Thus, the upgrade time is saved, and on the other hand, consumption of resources of the master headphone occupied by transferring data is avoided since the master headphone is not required to perform processes such as storing and reading data.

The various embodiments in this specification are described in a progressive manner, and each embodiment lays emphasis on differences from other embodiments. The same or similar parts between the embodiments may be referred to each other. Since the apparatus disclosed in the embodiment corresponds to the method disclosed in the embodiment, the description for the system is relatively simple. For related parts, reference may be made to description in the method embodiment.

The person skilled in the art may further appreciate that the units and algorithm steps of the examples described in connection with the embodiments disclosed herein may be implemented in electronic hardware, computer software or a combination thereof. In order to clearly illustrate the interchangeability of the hardware and software, the composition and steps of the various examples have been generally described in terms of function in the above description. Whether these functions are performed in hardware or software depends on the specific application and design constraints of the technical solution. The person skilled in the art may use different methods for implementing the described functions for each particular application, and such implementation should not be considered to be beyond the scope of the present disclosure.

The steps of the method or algorithm described according to the embodiments disclosed herein may be implemented in forms of hardware, a software module executed by a processor or the combination thereof. The software module may be placed in a Random Access Memory (RAM), a memory, a Read-Only Memory (ROM), an electrically programmable ROM, an electrically erasable programmable ROM, a register, a hard disk, a movable magnetic disk, CD-ROM or any other forms of storage medium well known in the art.

The method and system for upgrading a program of a TWS headphone, and the TWS headphone according to the present disclosure are described in details above. Specific examples are used herein to illustrate the principle and implementation of the present disclosure. The description of the above embodiments is merely to help understand the method and core idea of the present disclosure. It should be noted that for those ordinary skilled in the art, several improvements and modifications may be made to the present disclosure without departing from the principle of the present disclosure, and these improvements and modifications also fall within the protection scope of the claims of the present disclosure.

The invention claimed is:

1. A program upgrade method, applied to a true wireless stereo (TWS) headphone, wherein the TWS headphone comprises a first wireless headphone and a second wireless headphone arranged in pairs, and the program upgrade method comprises:
    establishing a wireless communication connection between the first wireless headphone and a terminal, and receiving, by the first wireless headphone, a first upgrade file sent by the terminal for upgrade; and
    establishing a wireless communication connection between the second wireless headphone and the terminal, and receiving, by the second wireless headphone, a second upgrade file sent by the terminal for upgrade after the first wireless headphone completes upgrade.

2. The program upgrade method according to claim 1, wherein the establishing a wireless communication connection between the first wireless headphone and a terminal comprises:
    receiving, by the first wireless headphone, an upgrade instruction, generating an upgrade response information for entering an over-the-air (OTA) mode, and sending the upgrade response information to the terminal, for the terminal to receive the upgrade response information and establish a Bluetooth low energy (BLE) wireless communication connection with the first wireless headphone.

3. The program upgrade method according to claim 2, wherein the receiving, by the first wireless headphone, an upgrade instruction and generating an upgrade response information for entering an OTA mode comprises:
    performing, by a headphone charging box, a BLE broadcast in a case that the headphone charging box detects a preset event, wherein a broadcast field comprises a field for notifying the headphone to prepare to enter the OTA mode; and
    executing an OTA code segment and performing a wireless communication scanning by the first wireless headphone, in a case that the headphone charging box detects that the first wireless headphone is placed at a first preset position, and generating, by the first wireless headphone, the upgrade response information for entering the OTA mode when an OTA signal is scanned by the first wireless headphone within a preset time period.

4. The program upgrade method according to claim 3, further comprising:
    disconnecting, by the first wireless headphone, the BLE wireless communication connection with the terminal, after the first wireless headphone completes upgrade; and
    sending an upgrade completion instruction to the terminal, for the terminal to prompt an information display item indicating that an upgrade operation is completed and prompt an operation display information about disconnecting the BLE broadcast of the headphone charging box, after the second wireless headphone completes upgrade.

5. A true wireless stereo (TWS) headphone, comprising: an audio output, a communication interface, a memory and a processor, wherein the processor is configured to upgrade a program of the TWS headphone by applying the program upgrade method according to claim 1.

6. A method for upgrading a program of a true wireless stereo (TWS) headphone, wherein the TWS headphone comprises a first wireless headphone and a second wireless headphone arranged in pairs, and the method comprises:
   establishing a wireless communication connection between a terminal and the first wireless headphone, and sending a first upgrade file for upgrade to the first wireless headphone through the terminal; and
   establishing a wireless communication connection between the terminal and the second wireless headphone, and sending a second upgrade file for upgrade to the second wireless headphone through the terminal after the first wireless headphone completes upgrade.

7. The method for upgrading a program of a TWS headphone according to claim 6, wherein before the establishing a wireless communication connection between a terminal and the first wireless headphone, and sending a first upgrade file for upgrade to the first wireless headphone through the terminal, the method further comprises:
   outputting an option for prompting whether to upgrade, when the terminal detects that a program version in a cloud has been updated; and
   receiving an option instruction for performing a program upgrade, and prompting an operation instruction information for starting the program upgrade.

8. A system for upgrading a program of a true wireless stereo (TWS) headphone, comprising: a terminal and a TWS headphone, wherein the terminal is configured to:
   establish a wireless communication connection with a first wireless headphone, and send a first upgrade file for upgrade to the first wireless headphone; and
   establish a wireless communication connection with a second wireless headphone, and send a second upgrade file for upgrade to the second wireless headphone after the first wireless headphone completes upgrade.

9. The system for upgrading a program of a TWS headphone according to claim 8, wherein the first wireless headphone is configured to: receive an upgrade instruction, generate an upgrade response information for entering an over-the-air (OTA) mode, and send the upgrade response information to the terminal; and
   the terminal is configured to: receive the upgrade response information, and establish a Bluetooth low energy (BLE) wireless communication connection with the first wireless headphone.

10. The system for upgrading a program of a TWS headphone according to claim 9, further comprising a headphone charging box, configured to perform a BLE broadcast in response to detecting a preset event, wherein a broadcast field comprises a field for notifying the headphone to prepare to enter the OTA mode; and
   the first wireless headphone is configured to: execute an OTA code segment and perform a wireless communication scanning, in response to detecting that the first wireless headphone is placed at a first preset position of the headphone charging box; and generate the upgrade response information for entering the OTA mode when an OTA signal is scanned within a preset time period.

11. A computer-readable storage medium for storing a computer program, wherein the computer program, when executed by a processor, implements the program upgrade method according to claim 1.

12. A true wireless stereo (TWS) headphone, comprising: an audio output, a communication interface, a memory and a processor, wherein the processor is configured to upgrade a program of the TWS headphone by applying the program upgrade method according to claim 2.

13. A true wireless stereo (TWS) headphone, comprising: an audio output, a communication interface, a memory and a processor, wherein the processor is configured to upgrade a program of the TWS headphone by applying the program upgrade method according to claim 3.

14. A true wireless stereo (TWS) headphone, comprising: an audio output, a communication interface, a memory and a processor, wherein the processor is configured to upgrade a program of the TWS headphone by applying the program upgrade method according to claim 4.

15. A computer-readable storage medium for storing a computer program, wherein the computer program, when executed by a processor, implements the method for upgrading a program of a true wireless stereo (TWS) headphone according to claim 6.

* * * * *